(12) United States Patent
Bringuier et al.

(10) Patent No.: US 6,775,443 B2
(45) Date of Patent: Aug. 10, 2004

(54) TIGHT BUFFERED OPTICAL CABLES WITH RELEASE LAYERS

(75) Inventors: Anne G. Bringuier, Taylorsville, NC (US); Samuel D. Navé, Conover, NC (US); Gregory A. Lochkovic, Hickory, NC (US)

(73) Assignee: Corning Cable Systems LLC, Hickory, NC (US)

( * ) Notice: Subject to any disclaimer, the term of this patent is extended or adjusted under 35 U.S.C. 154(b) by 66 days.

(21) Appl. No.: 09/771,672

(22) Filed: Jan. 29, 2001

(65) Prior Publication Data

US 2002/0102078 A1 Aug. 1, 2002

(51) Int. Cl.[7] .................................................. G02B 6/44
(52) U.S. Cl. ........................ 385/102; 385/100; 385/128; 385/123
(58) Field of Search ................................ 385/114, 128, 385/100, 123, 102

(56) References Cited

U.S. PATENT DOCUMENTS

| | | | |
|---|---|---|---|
| 5,381,504 A | 1/1995 | Novack et al. | ............. 385/128 |
| 5,408,564 A | 4/1995 | Mills | ............. 385/128 |
| 5,761,363 A | 6/1998 | Mills | ............. 385/114 |
| 6,014,488 A | * 1/2000 | Shustack | ............. 385/128 |
| 6,107,361 A | * 8/2000 | Tortorello et al. | .......... 522/114 |

FOREIGN PATENT DOCUMENTS

| | | | | |
|---|---|---|---|---|
| EP | 0780712 A2 | 6/1997 | ............ | G02B/6/44 |
| EP | 0838703 A2 | 4/1998 | ............ | G02B/6/44 |
| JP | 01-152405 | 6/1989 | ............ | G02B/6/44 |
| WO | WO97/05515 | 2/1997 | ............ | G02B/6/44 |
| WO | WO99/09443 | 2/1999 | ............ | G02B/6/44 |

\* cited by examiner

Primary Examiner—Tarifur R. Chowdhury
Assistant Examiner—George Y. Wang
(74) Attorney, Agent, or Firm—Timothy J. Aberle

(57) ABSTRACT

A tight buffered optical fiber having a protective layer generally surrounding the optical fiber, a release layer at least partially bonding to and generally surrounding the protective layer and a buffer layer generally surrounding and being strippable from the release layer. The release layer including an acrylate with oligomers, monomers and a reactive release substance distributed with a matrix. The reactive release substance may include a silicone selected from the group including methyl and phenyl silicones. The matrix may be mechanically or chemically bonded to the protective layer so that stripping the buffer layer does not remove the release layer.

11 Claims, 1 Drawing Sheet

TIGHT BUFFERED OPTICAL CABLES WITH RELEASE LAYERS

The present invention relates to fiber optic cables and, more particularly, to tight buffered optical cables.

Conventional tight buffered fiber optic cables form a background of the present invention. For example, U.S. Pat. No. 5,408,564, incorporated by reference herein, discloses a strippable tight buffered optical cable. The cable has an optical waveguide fiber, a protective coating surrounds the outer surface of the fiber, and an interfacial layer surrounds the protective coating. The interfacial layer includes particles of solid lubricant held together with a cross-linked film-forming binder. A buffer layer surrounds the external surface of the interfacial layer. The interfacial layer is designed to provide a very low friction interface between the first protective coating and the buffer layer. The interfacial layer is described as having a thickness of between about 4 to about 15 microns, and is preferably about 5 microns. The layer is formed by the cross-linking of a polymer in which solid particulate ultra high molecular weight polyethylene (UHMWPE) and/or solid polytetrafluoroethylene (PTFE) media have been dispersed. The dispersion has in excess of 90% non-volatiles and the solid particulate lubricant comprises 0.1% to 60% by weight of the dispersion. In terms of function, the solid lubricant, e.g., UHMWPE or PTFE, is designed to provide the desired improved strippability, while the cross-linked binder holds the solid lubricant in place on the first protective coating. The preferred cross-linkable binder is epoxy acrylate polymer.

The foregoing design has certain background characteristics. For example, where the distribution of the solid lubricant in the binder is non-uniform, the strippability forces can vary. In addition, the achievable length of strip can be limited to one foot lengths. Other problems can arise in production, for example, the solid lubricant can cause flaking of the coating. From a manufacturing standpoint, such flaking can result in clogging of the buffer layer extrusion die possibly requiring a shutdown of the manufacturing line. In connection with performance, unintended delaminations between the buffer and fiber can occur. Another issue is microbending caused by the solid lubricant particulates where the interfacial layer surrounds a 50 $\mu$m multi-mode fiber. Microbending issues are particularly crucial when the fibers are tight buffered with a thermoplastic or a flame-retardant polyethylene. Such materials can significantly contract during low temperature operations, potentially pushing the solid lubricant particles into microbending contact with the optical fiber.

Additionally, U.S. Pat. No. 5,761,363, incorporated herein by reference, discloses an optical fiber ribbon with an interfacial layer including a non-reactive liquid lubricant material, more particularly, a non-reactive silicone oil that is fugitive and non-compatible with the matrix. No chemical bonding is intended between the matrix and oil or between the matrix and protective coating.

The foregoing design has certain characteristics. For example, the interfacial layer is intended to adhere to the buffer layer rather than the protective coating leaving the protective coating so that the interfacial layer is stripped with the buffer layer. In other words, the fugitive silicone inhibits bonding between the interfacial layer and the protective coatings. Additionally, the silicone oil of 5% to about 19% by weight contributes to manufacturing costs.

ASPECTS OF THE INVENTION

One aspect of the present invention provides a tight buffered optical fiber including at least one optical fiber having a protective layer, a release layer and a buffer layer. The protective layer generally surrounds the optical fiber. The release layer generally surrounds the protective layer, at least partially bonding thereto, and includes an acrylate with oligomers, monomers, and a reactive release substance distributed within a matrix. The buffer layer generally surrounds the release layer and may be stripped from the release layer. The reactive release layer preferably includes silicone, more particularly, the release layer may be selected from the group consisting of methyl and phenyl silicones. Moreover, the matrix can be mechanically or chemically bonded to the protective layer so that stripping the buffer layer essentially does not remove the release layer. Additionally, the release layer preferably has a secant modulus of about 20–600 MPa, an elongation to break ratio of preferably less than about 10% and/or a tensile strength of less than about 20 MPa.

DETAILED DESCRIPTION OF THE INVENTION(S)

Figure 1:
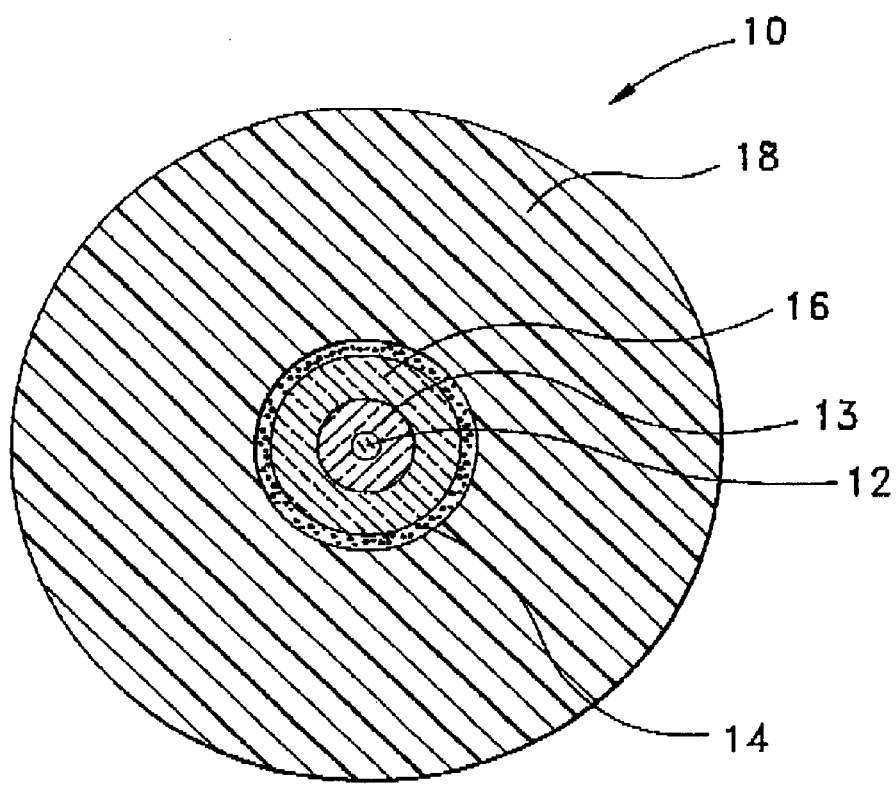
FIG. 1 is a cross-sectional view of a tight buffered optical cable constructed in accordance with the present invention.
Figure 2:
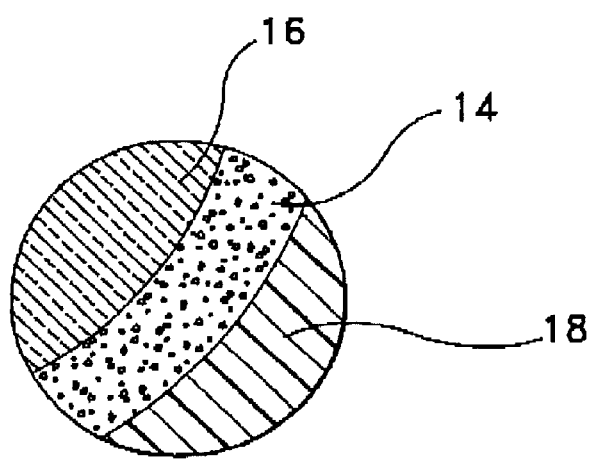
FIG. 2 is a partial cross-sectional view of the optical cable of FIG. 1 schematically showing the release layer constructed in accordance with the present invention.

Referring to FIG. 1, an exemplary tight buffered optical fiber 10 according to the present invention will be described. At preferably the center of tight buffered optical fiber 10 is at least one silica-based optical fiber with a core 12, cladding 13 having a lower index of refraction than the core, and a protective coating 16. For example, a single mode or multi-mode optical fiber made commercially available by, for example, Corning Incorporated, is suitable for use with the present invention. The protective coating 16 preferably has a relatively soft primary coating surrounding cladding 13, and a relatively hard secondary coating surrounding the soft primary coating. In a preferred embodiment of the present invention, the primary and secondary coatings are formulations including acrylate resins. Adjacent to protective coating 16 is a release layer 14. Surrounding release layer 14 is a generally circular buffer layer 18 formed of, preferably a Polyvinylchloride (PVC), nylon, urethane polymer, polyester or blends thereof. The outside diameter of layer 18 is preferably about 500 to 900 microns for thermoplastics, and about 400 to 900 microns for urethane acrylates.

In accordance with the present invention, release layer 14 comprises a liquid substance that avoids flaking and unintended delamination, supports up to a one-meter strippability, and may exhibit an improved temperature performance. In addition, shrinkback is controlled. Shrinkback is defined as the amount of fiber that gets exposed when a length of tight buffered fiber is placed in an 150° C. oven for 5 minutes. The most preferred release layer of the present invention comprises a urethane acrylate matrix material comprising oligomers, monomers, a photoiniatiator and an anti-oxidant, in combination with a reactive release substance, preferably a liquid silicone. In the preferred embodiment, the reactive substance contains molecularly functional groups, at least some of which form positive chemical bonds, i.e., cross-link, with functional groups in the matrix. Preferably, the reactive liquid substance comprises 0.5% to 10% by weight of the matrix. Moreover, the matrix preferably mechanically and/or chemically bonds to the secondary coating of protective layer 16. Such bonding preferably results in layer 14 being essentially nonstrippable during removal of the buffer layer. The reactive release substance mixes well with the matrix for generally uniform distribution in the release layer. Where silicone is the release substance, it is most preferably a reactive methyl silicone. Alternatively, a reactive phenyl silicone can be suitable for certain applications as well. The release layer can include additional substances selected from the group consisting of silicone micro-spheres, TEFLON oil, graphite, fugitive materials, and inks.

In an exemplary embodiment, release layer 14 has a thickness of about 3–8 microns, or for ruggedized cables, up to about 10–20 microns. The silicone acrylates are preferably substantially evenly distributed throughout the urethane acrylate structure. The distribution of liquid silicone molecules inhibits bonding of the buffer layer 18 to the protective coating 16 so that release layer 14 provides the required slip/release function with respect to buffer 18 during the stripping operation. The reactive silicone preferably has dangling chains that are long enough to reach the surface of the release layer adjacent buffer 18 and provide the release characteristics. Preferably, the thickness of the release layer is such that a substantial portion of the silicone chains extend to the surface of the release layer and do not become trapped in the bulk. The materials that may be used for this invention include both standard anionic or cationic cured systems. For instance, the cationic system may use epoxidized polydimethylsyloxane.

The cured urethane acrylate material preferably exhibits very good dimensional stability over a wide temperature range (−40° C. to 85° C.), thus minimizing any attenuation problems. The urethane acrylate materials of the present invention were chosen with an advantageous range of modulus and elongation values for stripping and mechanical performance characteristics. Advantageously, shrinkback is kept below about 5 mm. For easy strippability, release layer 14 preferably has a secant a modulus at 2.5% strain of about 20–500 MPa, more preferably a modulus of less than about 400 MPa. Release layer 14 preferably has a low elongation to break ratio of less than about 10%, and/or a tensile strength of less than about 20 MPa.

The present invention has thus been described with reference to the foregoing embodiments, which embodiments are intended to be illustrative of the inventive concepts rather than limiting. Skilled artisans will appreciate that variations and modifications of the foregoing embodiments may be made without departing from the scope of the appended claims.

What is claimed is:

1. A tight buffered optical fiber, comprising:

at least one optical fiber, said optical fiber having a protective layer;

a release layer, said release layer generally surrounding said protective layer and at least partially bonding thereto, said release layer comprising an acrylate with oligomers and monomers, and a reactive release substance distributed within a matrix, the reactive release substance having molecularly functional groups and at least some of the molecularly functional groups cross-link with the matrix; and a buffer layer, said buffer layer being strippable from said release layer.

2. The tight buffered optical fiber of claim 1, said reactive release substance comprising reactive silicone.

3. The tight buffered optical fiber of claim 1, said release layer being selected from the group consisting of methyl and phenyl silicones.

4. The tight buffered optical fiber of claim 1, said matrix mechanically or chemically bonding to said protective layer so that stripping said buffer layer from said optical fiber essentially does not remove said release layer from said optical fiber.

5. The tight buffered optical fiber of claim 1, said release layer preferably has a secant modulus of about 20–600 MPa.

6. The tight buffered optical fiber of claim 1, said release layer preferably has an elongation to break ratio of preferably less than about 10%.

7. The tight buffered optical fiber of claim 1, said release layer having a tensile strength of less than about 20 MPa.

8. The tight buffered optical fiber of claim 1, said release substance and matrix comprising functional groups, at least some of said functional groups chemically bonding.

9. The tight buffered optical fiber of claim 1, said buffer layer having a shrinkback of about 5 mm or less when placed in an oven at about 150° C. for about five minutes.

10. The tight buffered optical fiber of claim 1, the release layer further including one or more of the substances selected from the group of silicone micro-spheres, TEFLON oil, graphite, fugitive materials, and inks.

11. The tight buffered optical fiber of claim 1, the release layer further including an additive.

* * * * *